US011373217B2

(12) United States Patent
Michaelson et al.

(10) Patent No.: US 11,373,217 B2
(45) Date of Patent: Jun. 28, 2022

(54) DIGITAL MARKETING CONTENT REAL TIME BID PLATFORM BASED ON PHYSICAL LOCATION

(71) Applicant: Adobe Inc., San Jose, CA (US)

(72) Inventors: Cameron Chris Michaelson, Heber City, UT (US); Kevin Gary Smith, Lehi, UT (US); Natalee A. Villa, Salt Lake City, UT (US)

(73) Assignee: Adobe Inc., San Jose, CA (US)

( * ) Notice: Subject to any disclaimer, the term of this patent is extended or adjusted under 35 U.S.C. 154(b) by 283 days.

(21) Appl. No.: 15/808,710

(22) Filed: Nov. 9, 2017

(65) Prior Publication Data

US 2019/0139097 A1  May 9, 2019

(51) Int. Cl.
*G06Q 30/02* (2012.01)
*G06Q 10/08* (2012.01)

(52) U.S. Cl.
CPC ..... *G06Q 30/0275* (2013.01); *G06Q 30/0261* (2013.01); *G06Q 10/087* (2013.01)

(58) Field of Classification Search
CPC .............. G06Q 30/00; G06Q 30/284; G06Q 30/0275; G06Q 30/0261; G06Q 10/087
See application file for complete search history.

(56) References Cited

U.S. PATENT DOCUMENTS

| | | | |
|---|---|---|---|
| 8,799,081 B1 * | 8/2014 | Koran | G06Q 30/0275 705/14.71 |
| 9,027,099 B1 | 5/2015 | Saylor et al. | |
| 9,887,992 B1 | 2/2018 | Venkat et al. | |
| 11,062,368 B1 * | 7/2021 | Setchell | G06Q 30/0226 |
| 2007/0244750 A1 * | 10/2007 | Grannan | G06Q 30/0258 705/14.56 |
| 2008/0195664 A1 | 8/2008 | Maharajh et al. | |
| 2010/0323716 A1 | 12/2010 | Jaff | |
| 2011/0025816 A1 | 2/2011 | Brewer et al. | |
| 2011/0191150 A1 | 8/2011 | Blackhurst et al. | |
| 2012/0150619 A1 | 6/2012 | Jacob Sushil et al. | |
| 2012/0246003 A1 * | 9/2012 | Hart | G06Q 30/0261 705/14.57 |

(Continued)

FOREIGN PATENT DOCUMENTS

WO    WO-2014089236 A1 *  6/2014  ......... G06Q 30/0275

OTHER PUBLICATIONS

"First Action Interview Office Action", U.S. Appl. No. 15/430,066, filed Mar. 26, 2019, 3 pages.

(Continued)

*Primary Examiner* — John Van Bramer
(74) *Attorney, Agent, or Firm* — FIG. 1 Patents (57) ABSTRACT

Techniques and system are described for a real time bid platform to control output of digital marketing content to a potential consumer. In an example, impression data is generated by a physical retail environment or mobile device of the potential consumer based on a determined location of a user within a physical retail environment. The impression data is used by a digital marketing system to expose bid opportunities to a plurality of advertiser systems via the real time bid platform. The advertiser systems then generate bids based on impression data described as part of the bid opportunity, and may also be based on additional information the advertiser systems have about the potential consumer obtained from third-party systems. The bids are then used as a basis to control output of digital marketing content to the potential consumer.

20 Claims, 7 Drawing Sheets

(56) References Cited

U.S. PATENT DOCUMENTS

| | | | | |
|---|---|---|---|---|
| 2013/0066725 | A1* | 3/2013 | Umeda | G06Q 30/0275 705/14.66 |
| 2013/0173713 | A1 | 7/2013 | Anderson et al. | |
| 2014/0136451 | A1 | 5/2014 | Marti et al. | |
| 2014/0365334 | A1 | 12/2014 | Hurewitz | |
| 2015/0100435 | A1* | 4/2015 | Sanio | G06Q 30/0275 705/14.71 |
| 2015/0164399 | A1 | 6/2015 | Beg et al. | |
| 2015/0221151 | A1 | 8/2015 | Bacco et al. | |
| 2015/0278870 | A1* | 10/2015 | Priebatsch | G06Q 30/0267 705/14.64 |
| 2017/0124625 | A1 | 5/2017 | Williams et al. | |
| 2018/0234796 | A1 | 8/2018 | Saha et al. | |

OTHER PUBLICATIONS

"Non-Final Office Action", U.S. Appl. No. 15/430,066, filed Jan. 30, 2019, 12 pages.

"Pre-Interview First Office Action", U.S. Appl. No. 15/430,066, filed Feb. 5, 2019, 3 pages.

"Final Office Action", U.S. Appl. No. 15/430,066, filed Jun. 11, 2019, 14 pages.

"Shopkick—Shopping App", Retrieved at: http://www.shopkick.com/—on Dec. 12, 2016, 2 pages.

"Amazon Go", Retrieved at: https://www.amazon.com/b?node=16008589011—on Dec. 12, 2016, 2 pages.

"Wonder Mall—The Mall at your Fingertips", Retrieved at: http://wondermall.com/—on Dec. 12, 2016, 3 pages.

"Non-Final Office Action", U.S. Appl. No. 15/430,066, filed Jan. 13, 2020, 13 pages.

"Final Office Action", U.S. Appl. No. 15/430,066, filed May 26, 2020, 16 pages.

"Examiner's Answer to Appeal Brief", U.S. Appl. No. 15/430,066, filed Jan. 11, 2021, 7 pages.

"Patent Trial and Appeal Board Decision", U.S. Appl. No. 15/430,066, filed Dec. 14, 2021, 25 pages.

* cited by examiner

DIGITAL MARKETING CONTENT REAL TIME BID PLATFORM BASED ON PHYSICAL LOCATION

BACKGROUND

One of the greatest challenges faced by digital marketing systems is how to reach potential consumers at a physical retail environment, in other words in a "bricks-and-mortar" store. Conventional techniques typically involve newspapers, flyers, and loyalty cards that do not support targeting at all and thus are generic and inflexible. Although subsequent techniques have been developed to provide additional ways to reach potential consumers, these techniques are also typically generic and inflexible and therefore do not support targeted and personalized digital marketing content.

One such conventional example involves a beacon, which is typically implemented as a low powered and low cost device that is usable in conjunction with a mobile device (e.g., mobile phones and wearables) to indicate when the mobile device is located near the beacon. For example, the beacon may be configured as Bluetooth® Low Energy (BLE) device that transmits signals that are received by the mobile device when in close proximity. This proximity may then be used by an application of the mobile device that is associated with the beacon to trigger provision of digital content for viewing by a user. Beacons have been used to trigger output of digital content in a variety of different scenarios, such as to support indoor navigation within a store, merchandise offers at music concerts and sports stadiums, and so forth.

Conventional techniques and systems used to implement beacons, however, do not support targeting. Thus, digital marketing content provided by these systems may have little relevancy to the user that receives the digital marketing content. Because of this, a user may typically "opt out" of receiving digital content provided by these conventional techniques and systems, which may involve forgoing use of the application altogether or restricting this digital content from being output by the mobile device.

SUMMARY

Techniques and system are described for a real time bid platform to control output of digital marketing content to a potential consumer. These techniques and systems enable output of digital marketing content to a potential consumer at a time and location, at which, this output is most likely to influence the potential consumer, within a physical retail environment.

In an example, impression data is generated at a physical retail environment or mobile device of the potential consumer based on a determined location of a potential consumer within the physical retail environment. The impression data may include position context data that describes "what" is included at a determined location, inventory data describing availability of products or services at the physical retail environment, and/or user identification data that uniquely identifies the potential consumer or generally identifies qualities of the potential consumer, e.g., a user demographic.

The impression data is used by a digital marketing system to expose bid opportunities to a plurality of advertiser systems via the real time bid platform. The advertiser systems then generate bids based on impression data described as part of the bid opportunity, and may also be based on additional information the advertiser systems have about the potential consumer obtained from third-party systems. The bids are then used as a basis by the digital marketing system to control output of digital marketing content to the potential consumer. This may include use of output devices of the physical retail environment or a mobile device of the potential consumer. These actions are performed in real time such that the digital marketing content remains relevant to the determined location and potential consumer and thus has an increased likelihood of influencing the potential consumer.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional techniques available to digital marketing systems to reach potential consumers in physical retail environments are limited and lack personalization. For example, an application of a user's mobile phone may output a notification indicating that a particular phone retailer is near while walking through a mall based on proximity of the mobile phone to a beacon associated with the particular phone retailer. Conventional techniques to do so require active execution of a dedicated application that is particular to a service provider system that includes the beacon. Thus, conventional techniques are fractured and frustrating to users as well as consume significant amounts of computational resources to provide generic digital marketing content to each user regardless of whether that digital marketing content is or is not of interest to a user.

Accordingly, digital marketing content control techniques and systems are described for use in a physical retail environment that support a real time bid platform to enable digital marketing systems to reach potential consumers within a physical retail environment. Through use of these techniques, digital marketing content is output that is likely to have increased relevance to a potential consumer viewing the content, limits oversaturation in the provision of digital marketing content to the potential consumer, and may do so with increased efficiency in the consumption of computational resources by both the digital marketing system, mobile device of the user, and devices located at a physical retail environment.

To do so, impression data is generated at a physical retail environment, which may be performed using devices associated the physical retail environment and/or a mobile device associated with a potential consumer, e.g., a smart phone. The physical retail environment, for instance, may include location determination devices such as a camera system, RFID tags, beacons, and so forth. Likewise, the mobile device of the user may also include a location determination device, e.g., GPS, capture of a signal from a beacon of the physical retail environment, and so on. A variety of other examples are also contemplated, such as through use of shopping carts and baskets that are configured to indicate a position within the physical retail environment through use of a wide range of sensors. The impression data may also include data obtained from other sources, such as items that remain a user's shopping list (e.g., maintained on a user's mobile phone or "in the cloud"), items within a user's shopping cart (e.g., detected through use of RFID tags), and so forth.

The impression data describes a context of a position, at which, the potential consumer is located within the physical retail environment. The potential consumer, for instance, may be located at a particular position in a particular isle of the physical retail environment. Accordingly, the context of this position may include products or services that are available proximal to the position, advertisements, types or brands of the products or services, identify the general location (e.g., products located in that aisle or the store itself), and so forth.

The impression data may be generated in a variety of ways. The physical retail environment, for instance, may determine a position of the potential consumer as described above. From this, position context data is collected that describes a context of the physical retail environment at that location (i.e., "what" is located at that position) by using the position as an index into a data structure. The impression data may also include user identification data usable to uniquely identify the user (e.g., a login to a user account of a mobile application) and inventory data describing a product inventory available at the physical retail environment.

The impression data is then communicated to a digital marketing system via a network, e.g., by the physical retail environment and/or the mobile device of the potential consumer using the Internet. The digital marketing system implements a real time bid platform to provide opportunities to advertiser systems to distribute digital marketing content to the potential consumer. In this way, the platform acts as a bridge between the physical retail environment and the advertisers.

The digital marketing system, for instance, may employ an exchange manager module to make a bid opportunity available to multiple advertiser systems based on the impression data as part of a real time bid platform. Each of the advertiser systems, based on the bid opportunity and associated impression data, then generates a bid indicative of an amount the advertiser system is willing to pay based on the bid opportunity to cause output of selected digital marketing content. Thus, this amount reflects the value of the opportunity to the advertiser system.

A value of the bid, for instance, may be generated by the advertiser systems by comparing position context data of the impression data with digital marketing content and corresponding products and services of the advertiser system. For example, a relatively high value may be generated for digital marketing content that involves products or services available proximal to the determined location of the potential consumer, and a relatively low value otherwise. In this way, the advertiser system may determine an amount of correlation between the bid opportunity and digital marketing content associated with the advertiser system, which may thus influence a value of the bid and act to personalize the digital marketing content to the potential consumer.

The bid may also be based on what the advertiser system "knows" about the potential consumer based on the user identification data. For example, the advertiser system may include a user profile of the potential consumer based on information obtained from third parties other than the physical retail environment. This may describe user interaction with websites, purchases of products or services, and so forth with services other than the physical retail environment. As a result, each of the advertiser systems may have different insight into a potential consumer, different products or services associated with digital marketing content of the advertiser system, and so forth that may influence an amount to be specified as part of the bid. Thus, advertiser systems may also realize a competitive advantage available from different insights into characteristics of the potential consumer, which again is not possible in conventional systems.

The bids are collected by the exchange manager module from the advertiser systems, and from these, a winning bid is selected. The exchange manager module then controls exposure of digital marketing content associated with the advertiser system that submitted the winning bid. The advertiser system, for instance, may communicate the digital marketing content to the digital marketing system for output to the user, may specify an item of digital marketing content maintained at the digital marketing system, may communicate the item directly, and so forth. The selected item of the winning advertiser system is then output to the user, e.g., via the mobile device, a display device or audio device associated with the physical retail environment, and so forth.

The exchange manager module, thus, as part of the digital marketing system is configured to support a real time bid platform that provides a bridge between a physical retail environment and advertiser system. The exchange manager module does so by collecting impression data associated with a potential consumer, either from the physical retail environment or from a mobile device of the potential consumer, and communicates this data as a bid opportunity to the advertiser systems. The advertiser systems are thus made aware of the potential consumer and may generate a bid for an opportunity to cause output by digital marketing content to that potential consumer that is targeted towards that consumer. In this way, the advertiser system is provided access to potential consumers while the consumers are positioned at particular locations within a physical retail environment. Further, this access is provided at a point at which the potential consumer is most likely to be influenced by exposure to the digital marketing content by being within the physical retail environment, which is not possible using conventional techniques.

Term Examples

"Digital marketing content" is typically provided to users in order to increase a likelihood that a user will interact with the content or another item of digital marketing content toward purchase of a product or service, which is also referred to as conversion. In one example of use of digital marketing content and conversion, a user may navigate through webpages of a website of a service provider. During this navigation, the user is exposed to advertisements relating to the good or service. If the advertisements are of interest to the user, the user may select the advertisement to navigate to webpages that contain more information about the product or service that is a subject of the advertisement, functionality usable to purchase the good or service, and so forth. Each of these selections thus involves conversion of interaction of the user with respective digital marketing content into other interactions with other digital marketing content and/or even purchase of the good or service. Thus, configuration of the advertisements in a manner that is likely to be of interest to the users increases the likelihood of conversion of the users regarding the product or service.

"Physical environment" refers to the real world as sensed by a human that includes purely physical characteristics. This is contrasted with a virtual environment as recreated by a computing device.

"Real time" refers to processing of input data by a computing device within milliseconds so that the processed data is output as experienced by a user to appear as immediate feedback. "Real time distribution" involves communication of digital content in real time, e.g., transmission by a computing device for viewing by a user and/or receipt by another computing device.

"Bid" is an offer of a price, generally during an auction, for a corresponding opportunity associated with the bid. Opportunities available via auction include purchase of a good or service. Opportunities may also include an opportunity to expose digital marketing content by a digital marketing system to a prospective consumer.

"Impression data" describes characteristics of a digital marketing opportunity. Impression data, for instance, may describe "who" is a subject of the marketing opportunity, e.g., a prospective consumer. Impression data may also describe "what" is included at a determined location of the prospective consumer, inventory data describing availability of products or services at the physical retail environment, and/or user identification data that uniquely identifies the potential consumer or generally identifies qualities of the potential consumer, e.g., a user demographic. Thus, the impression data may describe a "context of a user's physical location" within a physical environment as described above.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
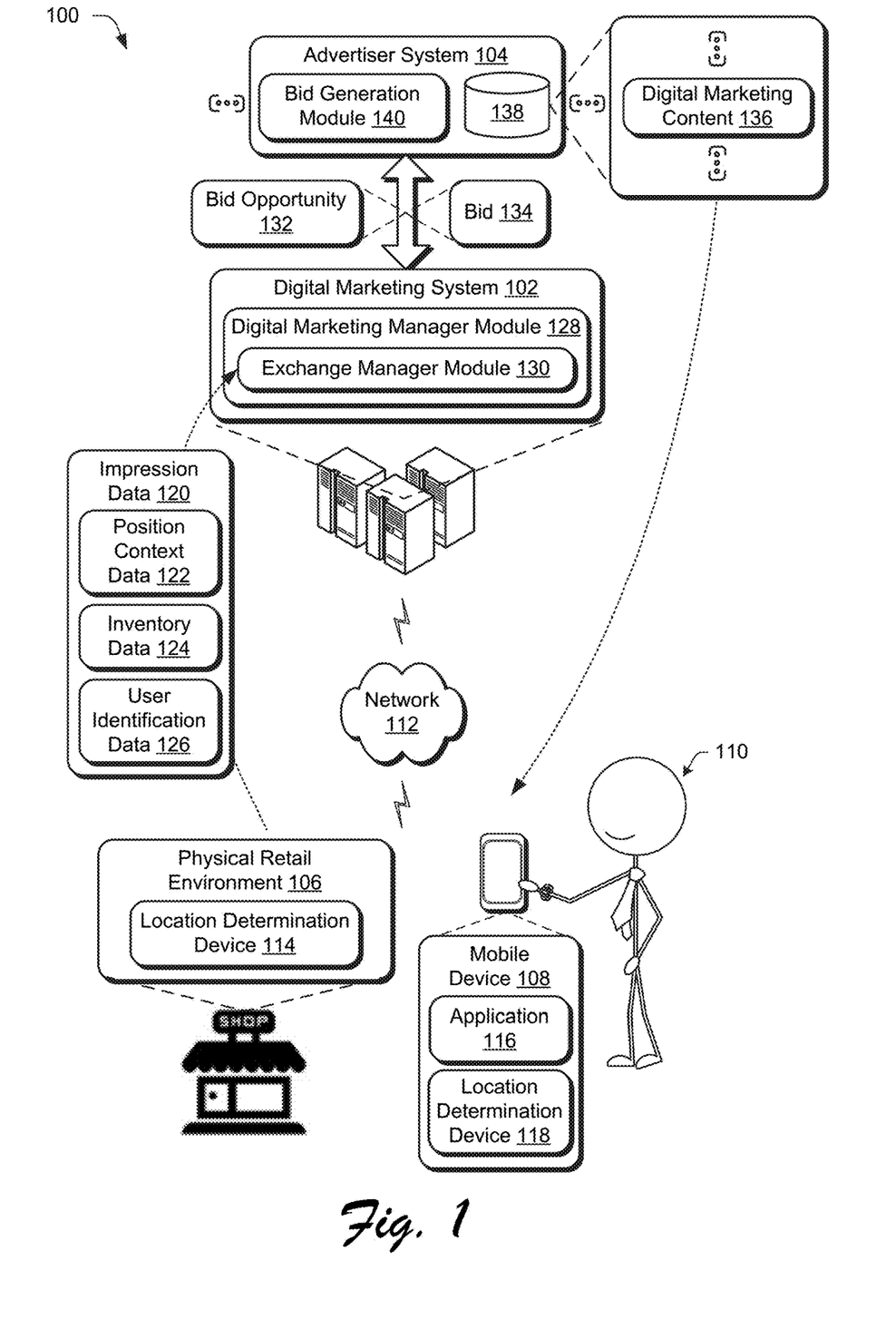
FIG. 1 is an illustration of an environment in an example implementation that is operable to employ real time bid platform techniques described herein.

FIG. 1 is an illustration of a digital medium environment 100 in an example implementation that is operable to employ real time bid platform techniques described herein. The illustrated environment 100 includes a digital marketing system 102, an advertiser system 104, a physical retail environment 106, and a mobile device 108 that is associated with a potential consumer 110. The digital marketing system 102, advertiser system 104, physical retail environment 106, and mobile device 108 are communicatively coupled, one to another, via a network 112. Computing devices that implement these entities may be configured in a variety of ways.

A computing device, for instance, may be configured as a desktop computer, a laptop computer, a mobile device (e.g., assuming a handheld configuration such as a tablet or mobile phone as illustrated for mobile device 108), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, the computing device may be representative of a plurality of different devices, such as multiple servers utilized by a business to perform operations "over the cloud" for the digital marketing system 102 and advertiser system 104 and as further described in relation to FIG. 7.

The techniques and systems described herein are used to first determine a position of the potential consumer 110 within the physical retail environment 106. This may be performed in a variety of ways. The physical retail environment 106, for instance, may include one or more location determination devices 114 to determine a likely location of the potential consumer 110 within the environment. Examples of location determination devices 114 include beacons, radar-based devices (e.g., radar techniques using Wi-Fi signals), RFID tracking (e.g., from shopping carts), camera systems, and so forth.

The mobile device 108 may also be configured to indicate a likely position of the potential consumer in the physical retail environment 106. The mobile device 108, for instance, may be configured as a mobile phone, tablet, wearable (e.g., smart watch) or other configuration having a location determination device 118. The location determination device 118, for instance, may be configured to determine the location itself, such as through use of a GPS device, cellular triangulation, and so forth.

In another instance, the location determination device 118 is configured to act in conjunction with the location determination device 114 of the physical retail environment 106, such as through execution of an application 116 on the mobile device 108. In one such example, the location determination device 114 of the physical retail environment is configured as a beacon. As previously described, a beacon is typically implemented as a low powered and low cost device that is usable in conjunction with the mobile device 108 to indicate when the mobile device 108 is located near the beacon.

In an implementation, the beacon is configured as Bluetooth® Low Energy (BLE) device that transmits signals that are received by the mobile device 108 when in close proximity. This proximity may then be used by an application 116 of the mobile device 108 that is associated with the beacon to determine a location of the potential consumer 110 in the physical retail environment 106. Other examples of determination of a physical location within the physical retail environment 106 of a mobile device 108 and/or potential consumer 110 associated with the mobile device 108 are also contemplated as further described in relation to FIG. 3.

The determined physical location of the potential consumer 110, whether from the physical retail environment 106 and/or the mobile device 108, is then used to generate impression data 120 for communication via the network 112 to the digital marketing system 102. The physical location, for instance, describes a likely location of the potential consumer 110 within the physical retail environment 106. Impression data 120, therefore, is generated to describe characteristics that are usable to determine a potential value of an impression of digital marketing content to the potential consumer 110 based on the location. Examples of these characteristics include position context data 122, inventory data 124, and user identification data 126.

Position context data 122 describes a context of the determined position within the physical retail environment 106. The determined position, for instance, may be used at an index to collect position context data 122 to describe characteristics of what is included or available at the determined location. This may include products or services for sale, the types or brands of the products or services, advertising that is displayed at the determined location, characteristics of the general area (e.g., aisle), environmental conditions (e.g., outside or inside), and so forth.

Inventory data 124 is used to describe an inventory of products or services available at the physical retail environment 106. In this way, the inventory data 124 gives insight into what is available such that advertiser systems do not bid on opportunities to purchase products or services that are not available, gain insight into competing products or services, and so forth.

User identification data 126 is used to identify the potential consumer 110 (i.e., a user) that is a subject of the potential impression of digital marketing content. The user identification data 126, for instance, may be determined based on a user login to an application 116 associated with the physical retail environment 106. The user identification data 126 may also be based on facial recognition (e.g., in conjunction with a social network service) or any other technique to identify the user. This may be used to uniquely identify the potential consumer 110 or general characteristics of the potential consumer 110, e.g., demographic information learned through processing of an image of the user such as range in age.

The impression data 120 is then received by a digital marketing manager module 128 and exchange manager module 130. The exchange manager module 130 is implemented at least partially in hardware of a computing device to support a real time bid platform between the physical retail environment 106 and a plurality of advertiser systems 104. In other words, the exchange manage module 130 implements an exchange that is accessible via the network 112 in real time (e.g., via application programming interfaces, digital communications) to provide bid opportunities 132 and receive bids 134 from the advertiser system 104. The bids 134 place a value of the opportunity generated by each of the advertiser systems 104 to expose digital marketing content 136 to the potential consumer 110 at the physical retail environment 106. The digital marketing content 136 is illustrated as stored at the advertiser system 104 in a storage device 138. The digital marketing content 136 may also be stored and maintained elsewhere, such as by the digital marketing system 102.

The advertiser system 104, for instance, may generate the bid 134 through use of a bid generation module 140. The bid generation module 140 is configured to take into account characteristics of the bid opportunity 132 as defined by the impression data 120. This may include the position context data 122, inventory data 124, and/or user identification data 126. As described above, for instance, the position context data 122 describes a context of the determined location of the potential consumer 110 within the physical retail environment 106. This may include what products are services are available at the location, types of products or services, brand names, and so forth. The position context data 122 is compared to the digital marketing content 136 to determine an amount of relevancy of the digital marketing content 136 to the position context data 122, such as through keyword comparison, natural language processing, and so forth as described in relation to FIG. 3. In this way, a value of the bid 134 may accurately reflect an amount of relevancy of the digital marketing content 136 to that context.

The bid generation module 140 may also generate the bid 134 based on inventory data 124. The digital marketing content 136, for instance, may relate to a product or service that is not currently available at the physical retail environment 106. Accordingly, the bid generation module 140 may choose to forgo generating a bid (i.e., a bid 134 of zero value) for such an opportunity. This may also be used to gain insight into other products or services that are available, e.g., competitors' products which may be used to increase a value of the bid 134.

The bid generation module 140 may also take into account user identification data 126. Each of the advertiser systems 104, for instance, may have a user profile describing the potential consumer 110. Advertising agencies, for instance, typically maintain user profiles for a multitude of potential consumers. The user profiles may be based on a variety on data obtained from a variety of different sources, such as third-party analytics systems, digital content provider systems, and so forth. Availability of this data may vary between advertiser systems 104, and thus provide competitive advantages between the advertiser systems 104. Accordingly, the real time bid platform as implemented by the exchange manager module 130 provides a way to leverage these insights into generation of the bid 134, which is not possible using conventional techniques.

The exchange manager module 130, upon receipt of the bids 134, then chooses a winner, which is provided an opportunity to cause the digital marketing content 136 for output to the potential consumer 110. This may be performed using the mobile device 108 associated with the potential consumer 110, an output device disposed in the physical retail environment 106 (e.g., display devices, speakers), and so forth. The exchange manager module 130 is configured to support real time interaction with the physical retail environment 106 and the advertiser systems 104 such that the impression data 120 and digital marketing content 136 output based on the impression data 120 are relevant to each other. As a result, the real time bid platform supported by the exchange manager module 130 provides an ability to support digital marketing content 136 output by the advertiser system 104 at a point in time at which the potential consumer 110 is most likely to be influenced by this output by being located at particular locations within the physical retail environment. Additional examples of which are described in the following discussion and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
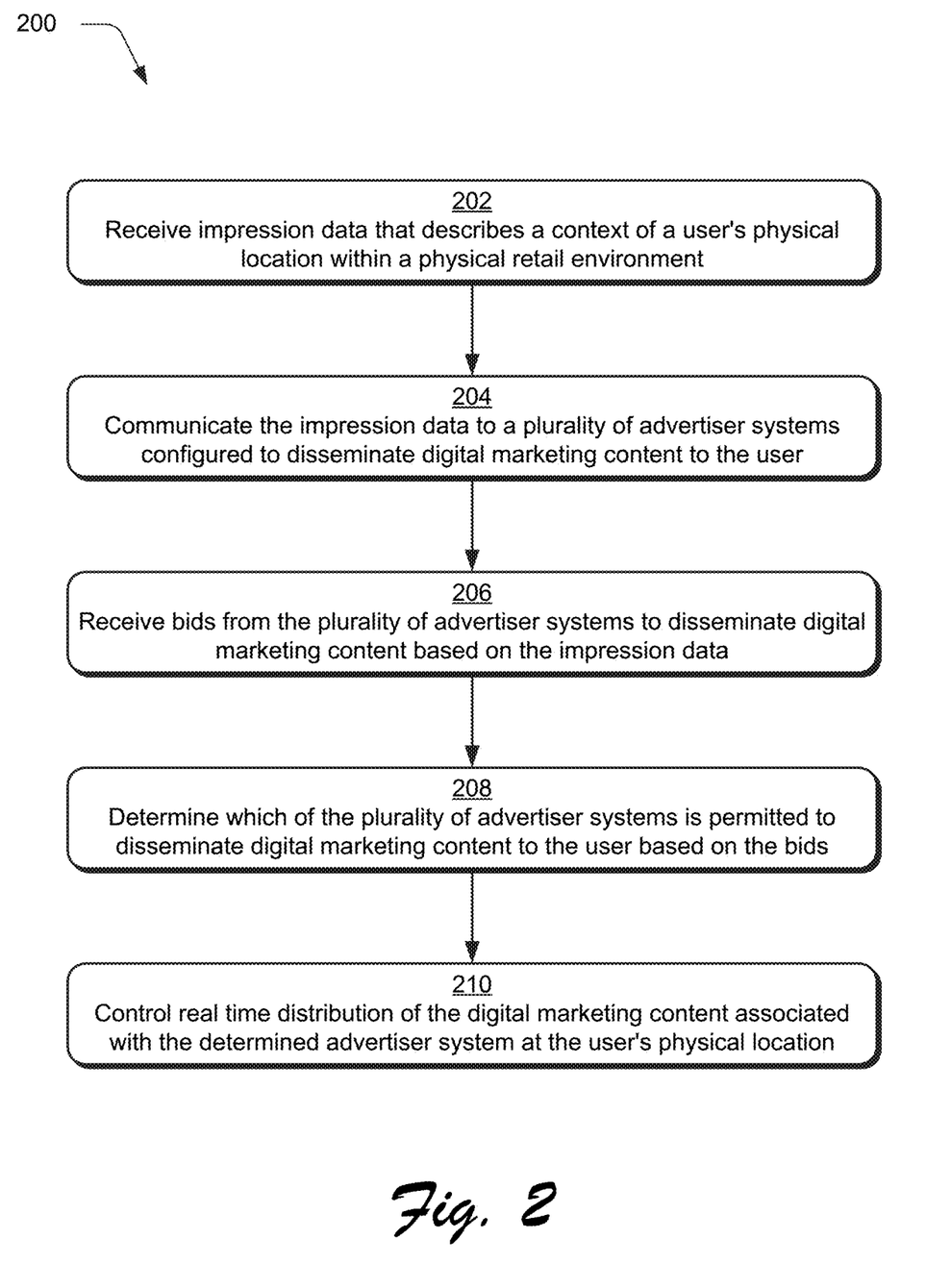
FIG. 2 is a flow diagram depicting a procedure in an example implementation in which a real time bid platform is used to control exposure of digital marketing content to a potential consumer based on impression data of a location of the potential consumer within a physical retail environment.

FIG. 2 depicts a procedure 200 in an example implementation of operation of a real time bid platform to control distribution of digital marketing content based on physical location. The following discussion describes techniques that may be implemented utilizing the systems and devices of FIGS. 3-6. Aspects of the procedure may be implemented in hardware, firmware, software, or a combination thereof. The procedure is are shown as a set of blocks that specify operations performed by one or more devices and are not necessarily limited to the orders shown for performing the operations by the respective blocks. In the following discussion, reference will be made interchangeably to FIGS. 2-6.

As previously described, one of the greatest challenges to digital marketing systems 102 and associated advertiser systems 104 is how to reach potential consumers 110 in a physical retail environment 106. There is no way, in conventional techniques and systems, to provide targeted digital marketing content (i.e., personalized) to a potential consumer in a physical retail environment. Rather, these conventional techniques and systems are limited to provision of generic digital marketing content, e.g., using beacons and generic messages. Accordingly, this generic digital marketing content has a decreased likelihood of causing conversion of a product or service and has increased computational costs to therefore provide additional items of content in order to cause conversion.

Further, physical retail environments 106 do not have an opportunity in conventional techniques to monetize presence of the potential consumer 110 to the advertiser systems 104. Rather, physical retail environments 106 are limited in conventional techniques to use of in-store announcements, flyers, coupon mailers, and loyalty cards which may have limited applicability also due to their generic nature, i.e., lack of targeting to potential wants of particular potential consumers. Accordingly, in the techniques described herein the real time bid platform may collect values as specified by the bids for receipt by the physical retail environments, a portion of which may be retained by the digital marketing system 102.

Thus, the real time bid platform of the exchange manager module 130 acts to unite physical retail environments 106 with advertiser systems 104 based on physical location of the potential consumer 110 within the environment. As a result, the advertiser system 104 is given opportunities to disseminate personalized digital marketing content 136 at the physical retail environment 106, which is not possible using conventional techniques. Further, the physical retail environment 106 is also given additional revenue opportunities through use of the platform to permit output of this content and increase a user's experience within the environment, which is also not possible in conventional techniques.

To begin in this example, impression data is generated at a physical retail environment 106 that is based on a user's physical location within the physical retail environment. As shown in an example system 300 of FIG. 3, for instance, a potential consumer 110 is disposed within a physical retail environment 106, with or without an associated mobile device 108. The physical retail environment 106 includes a location determination device 114 and location determination module 302 that is configured to determine the potential consumer's 110 physical location. This may be performed by a variety of devices, examples of which include a beacon 304, camera system 306, RFID system 308, and radar system 310.

Figure 3:
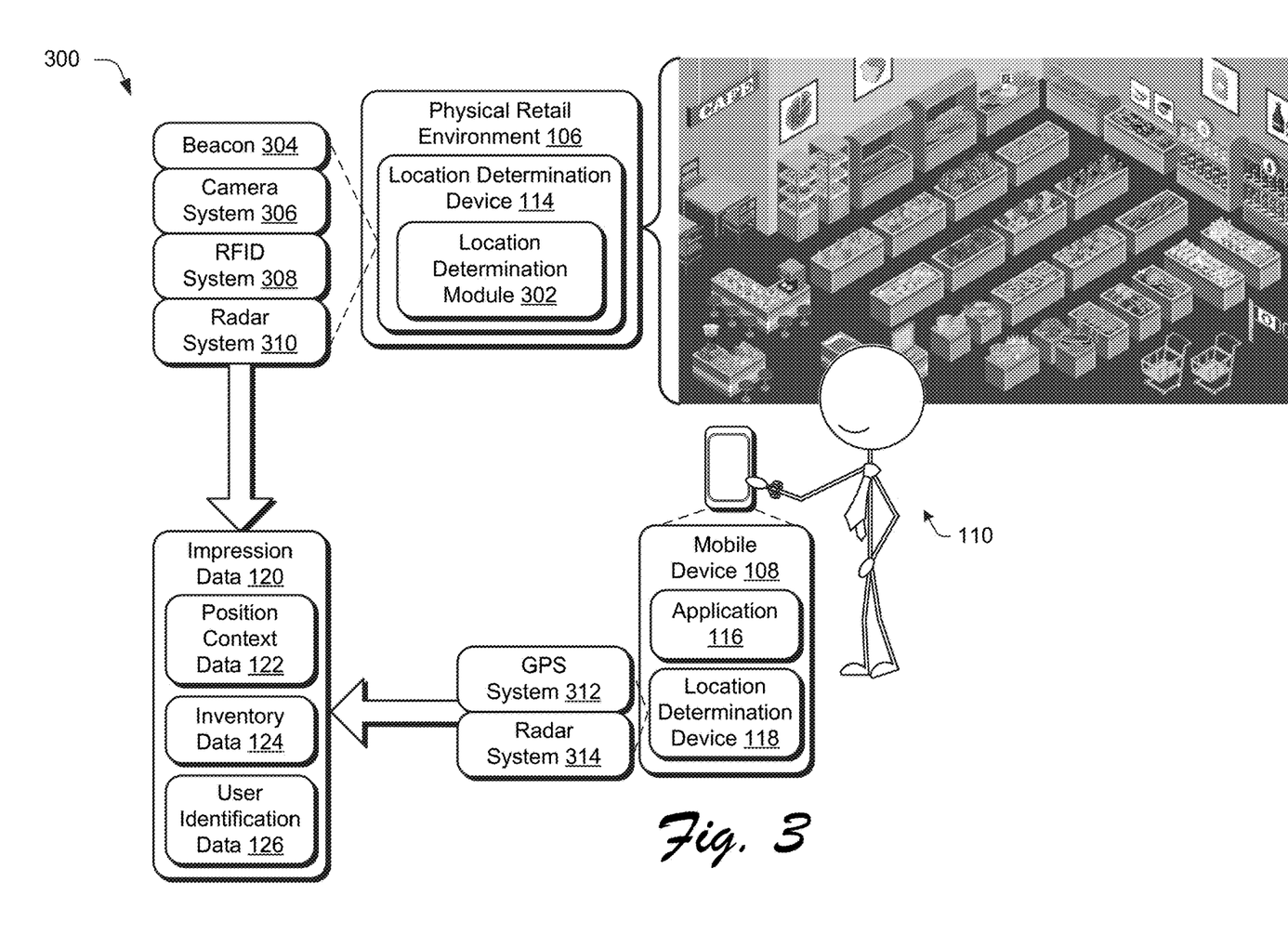
FIG. 3 depicts a system in an example implementation of determination of a location of the potential consumer within the physical retail environment.

The beacon 304, for instance, may be used in conjunction with the mobile device 108 to determine when the mobile device 108 is within a defined range of signals output by the beacon 304. In another instance, the camera system 306 may use object recognition functionality, such as a neural network as part of machine learning, to determine when a user is positioned at particular locations in the physical retail environment 106 and even an identify of the user. In a further instance, a radio frequency identification (RFID) system 310 is used. The RFID system 310, for instance, may include passive or active RFID tags and readers to determine when particular items are with range of the readers, e.g., a shopping cart, basket, products, and so forth within range of readers dispersed at known locations in the physical retail environment 106. In yet another example, a radar system 310 is used that emits radio waves (e.g., Wi-Fi signals) and from these waves determines a location of objects (e.g., the potential consumer 110) within the physical retail environment 106.

The location determination device 118 of the mobile device 108 may also be configured in a variety of ways to support determination of a location of the potential consumer 110 within the physical retail environment 106. The location determination device 118, for instance, may employ a GPS system 312 that may receive GPS signals transmitted within the physical retail environment 106. The GPS signals, for instance, may be supplemented locally within the physical retail environment 106 through use of localized signal emitters. The location determination device 118 may also include a radar system 314 (e.g., in accordance with Project Tango) much like the radar system 310 for the physical retail environment 106 in which Wi-Fi signals are employed using radar techniques to determine the location within the physical retail environment 106. Other examples are also contemplated, including use of a camera system and object recognition using a neural network to recognize objects and corresponding locations within the physical retail environment 106.

Impression data 120 is then generated based on the determined location of the potential consumer 110 within the physical retail environment 106. The location determination module 302, for instance, may use the determined location as a lookup (e.g., into a database or other data storage device) to obtain position context data 122 that describes characteristics of that location within the physical retail environment 106. This may include types of products or services available at the location, brand names, characteristics of a collective area (e.g., aisle), etc. Thus, the position context data 122 goes beyond describing "where" the potential consumer 110 is located, but rather describes "what" is positioned at the location. The position context data 122 may also be generated locally by the mobile device 108, through object recognition performed by the mobile device 108 using machine learning.

The impression data 120, as previously described, may also include inventory data 124. Inventory data 124 describes a number of particular products that are available at the physical retail environment 106. This may be performed by the location determination module 302 or the application 116 of the mobile device 108 by accessing an application programming interface of an inventory control system of the physical retail environment 106, whether locally or via the network 112.

The impression data 120 may also include user identification data 126 that may uniquely or generally (e.g., via demographics) identify the potential consumer 110. The potential consumer 110, for instance, may login to an application 116 and thus uniquely identify the potential consumer 110. Object recognition techniques may also be employed in which machine learning is employed as part of facial recognition by a neural network to uniquely identify the user by location determination device 114 of the physical retail environment 106 or a location determination device 118 of the mobile device 108 using camera systems. Camera systems and object recognition may also be used to identify demographics of the user that describe the potential consumer 110 generally but not uniquely, e.g., to determine a likely age range or other demographic information.

Figure 4:
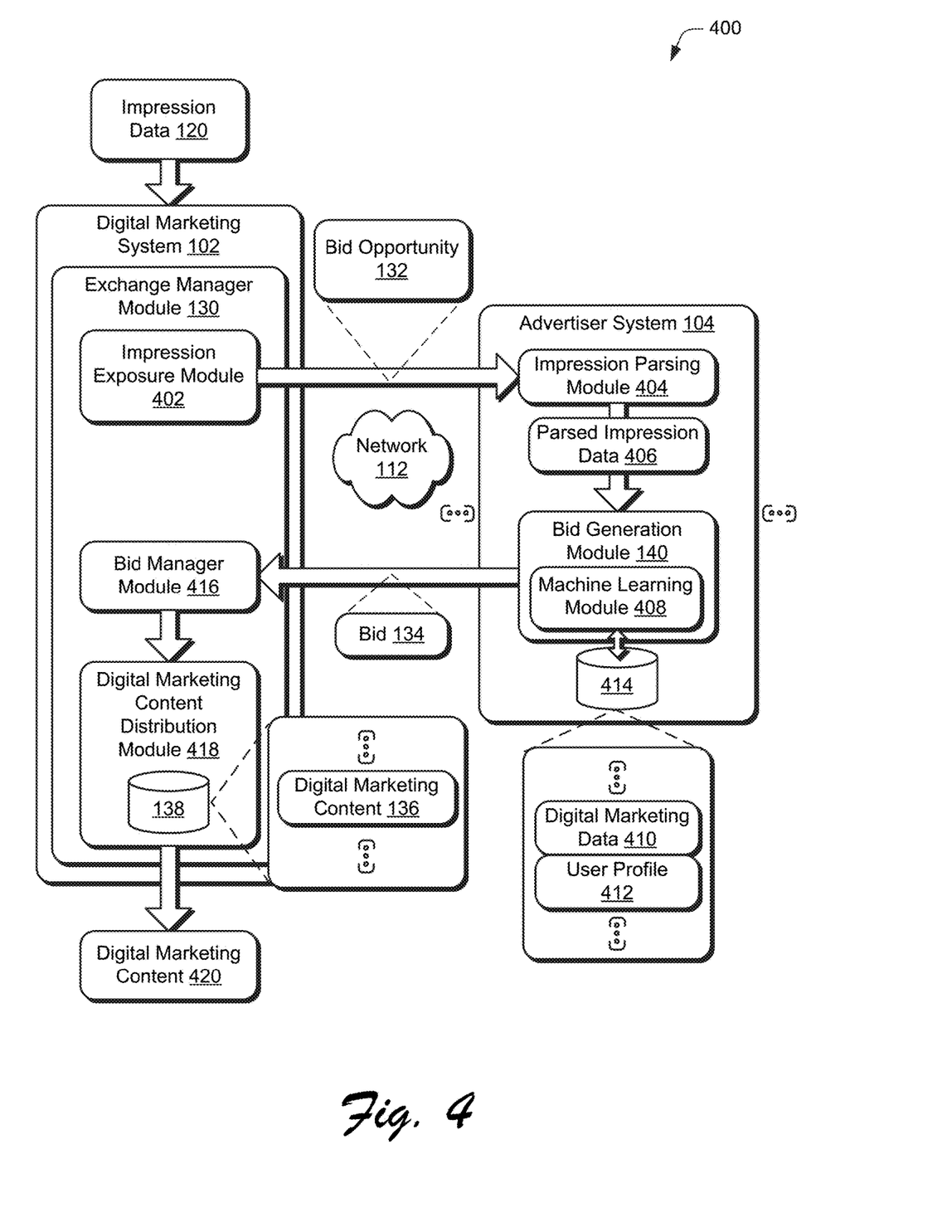
FIG. 4 depicts a system in an example implementation of operation of a real time bid platform by a digital marketing system.

As shown in the example system 400 of FIG. 4, the impression data 120 is then received by the digital marketing system 102 that describes a context of the user's physical location within the physical retail environment 106 (block 202). The exchange manager module 130, for instance, receives the impression data 120 and configures the data as a bid opportunity 132 for communication to the plurality of advertiser systems that are configured to disseminate digital marketing content to the user (block 204). An impression exposure module 402, for instance, may receive the impression data 120 and from the impression data 120 determine which advertiser systems 104 are likely to be interested in the bid opportunity 132. This may be based on similarity of products or services made available at the physical retail environment to digital marketing content and corresponding products or services of the respective advertiser systems 104. In this way, the impression exposure module 402 may act to "pre-screen" the impression data 120, thereby improving computational and network efficiency and support real time processing. Other examples are also contemplated, such as to locate a list of advertiser systems 104 that have subscribed to receive bid opportunities 132 from particular physical retail environments 106, e.g., for a fee paid to respective physical retail environments 106.

The impression exposure module 402 may also supplement the impression data 120 as part of the bid opportunity 132 to include data from the digital marketing system 102 that may not be available at the physical retail environment 106. The digital marketing system 102, for instance, may include additional data usable to identify the potential consumer 110, characteristics of the potential consumer, likes or dislikes of the potential consumer 110, and so forth. The digital marketing system 102, for instance, may include a user profile that is based on user interaction with digital marketing content as collected by a third-party service (e.g., similar to FIG. 5), from user interaction with the application 116, monitored user interaction with other physical retail environments 106, and so on. The bid opportunity 132 may be communicated to the advertiser system 104 using a variety of techniques, such as via electronic message (e.g., email or instant message), exposed via an application programming interface, and so on.

The advertiser system 104, upon receipt of the bid opportunity 132, first employs an impression parsing module 404 to generate parsed impression data 406 from the bid opportunity 132. This may be used to identify keywords and syntax from the bid opportunity 132, such as via natural language processing using machine learning. In this way, the impression parsing module 404 may be configured to accept bid opportunities 132 from a variety of different digital marketing systems 102 that may be configured to employ different language syntaxes and use different terminology.

The parsed impression data 406 is then communicated to a bid generation module 140 to generate the bid 134. The bid generation module 140, for instance, may employ a machine learning module 408 to process the parsed impression data 406 to determine a value of the bid opportunity 132 to cause output of digital marketing content 136 to the potential consumer 110. The machine learning module 408, for instance, may employ a neural network to process the parsed impression data 406. This processing may include use of digital marketing data 410 that describes digital marketing content 136 and past deployment of this content to determine a likelihood of conversion to the potential consumer 110 at the location within the physical retail environment 106. This likelihood then serves as a basis to specify a value for the bid 134 that the respective advertise system 104 places on the bid opportunity 132. In this way, the machine learning module 408 may take into account products or services located proximal to the location, types of products or services, advertisements included at the location by the physical retail environment 106, and so on.

The machine learning module 408 may also take into account a user profile 412, which is illustrated as stored in a storage device 414 along with the digital marketing data 410. The user profile 412 describes what the advertiser system 104 has learned about the identified user from the impression data 120, even from sources outside of the physical retail environment 106. Each advertiser system 104 may correspond to a different brand of product or service, or an advertising agency that is configured to provide digital marketing content particular to certain products or services. Each of these advertiser systems 104 may therefore have access to different information that describes the user, which is used to generate a user profile 412 that serves as a basis to target personalized digital marketing content to the potential consumer 110.

Figure 5:
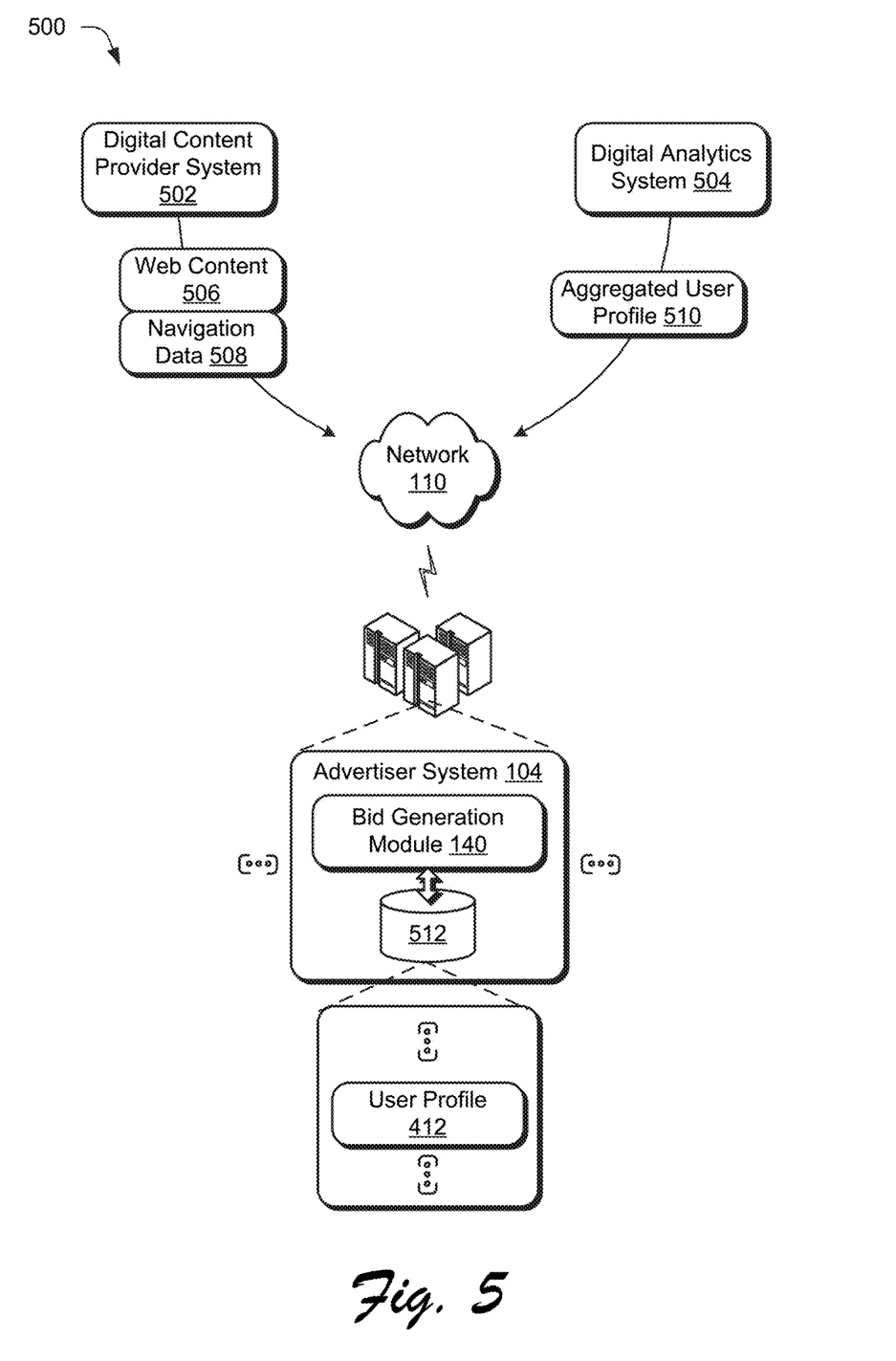
FIG. 5 depicts a system in an example implementation of generation of a user profile by an advertiser system.
Figure 6:
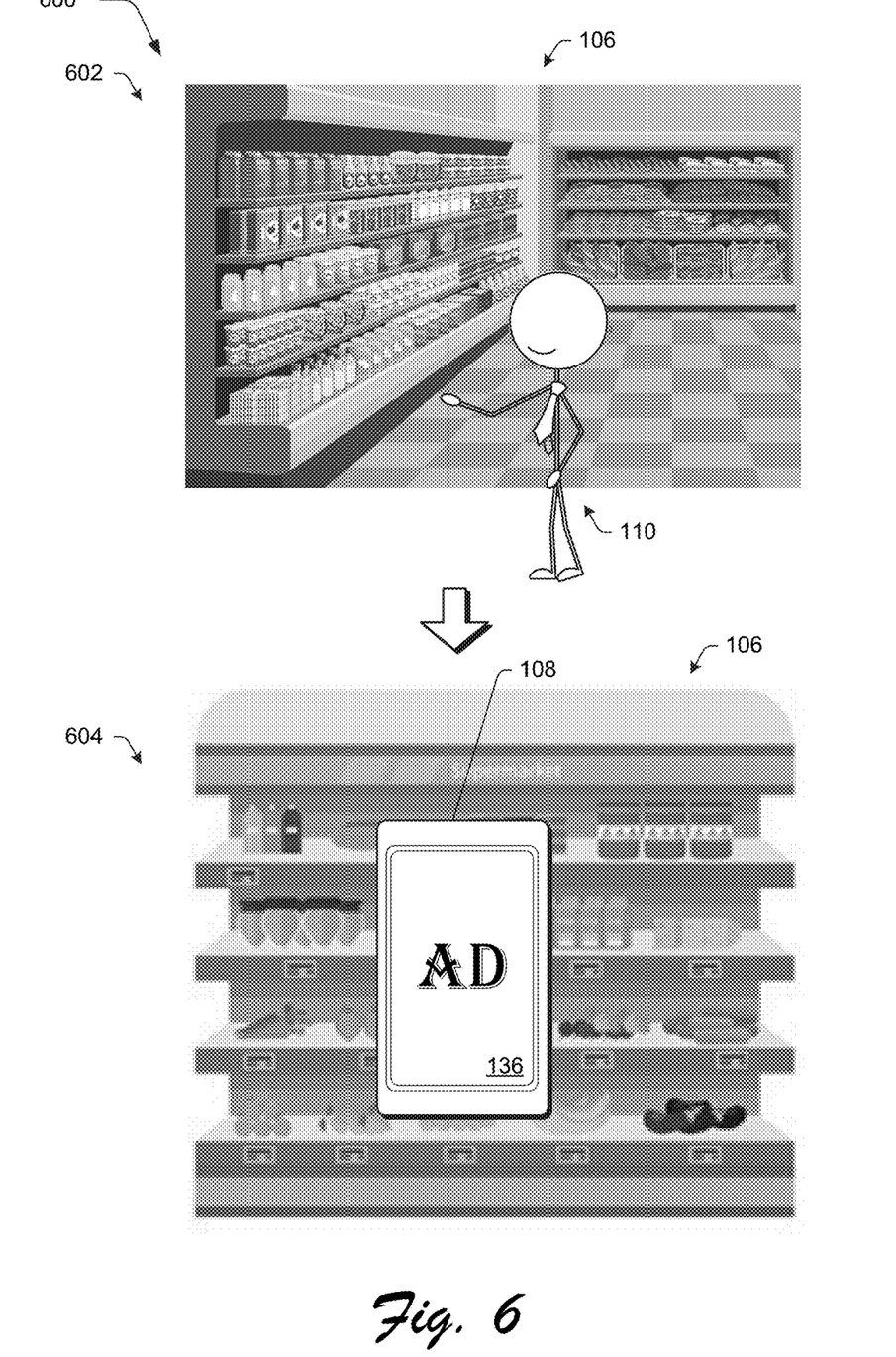
FIG. 6 depicts an example implementation of determination of the location of the potential consumer and output of digital marketing content in real time.

As shown in the system 500 of FIG. 5, for instance, the advertiser system 104 is configured to receive data from a digital content provider system 502 and a digital analytics system 504. The digital content provider system 502 is configured to provide digital content such as digital video, audio, and so forth for download or streaming to users. Thus, data may be collected describing this content and thus likes and dislikes of an associated user. Digital marketing content may also be output by the digital content provider system 502 in conjunction with the digital content, and thus data received form the digital content provider system 502 may also be used to determine a likelihood of conversion. The digital content provider system 502 may also generate data that describes web content 506 and navigation data 508. Websites, for instance, may track a user (e.g., using a cookie) across different websites, webpages, and interaction at those websites and webpages. This data is then used to generate a user profile 412.

The digital analytics system 504 may also provide data to be used by the advertiser system 104 in generating the user profile 412. The digital analytics system 504, for instance, may be configured to aggregate user profiles 510 from a variety of different sources, such as social network systems, ecommerce systems, and so on. The aggregated user profile 510 is then used by the advertiser system 104 as part of the user profile 412.

Thus, the user profile 412 employed by the advertiser system 104 as a basis to generate the bid by the bid generation module 140 may employ a wide range of information learned about a user. Because different advertiser systems 104 have access to different information about the user, this may provide a competitive advantage to those advertiser systems 104 that have greater user insights based on this information. Accordingly, through use of the real time bid platform, these advantages may be realized to target personalize digital marketing content at an accurate value through use of a bid, which is not possible in conventional generic digital marketing systems.

Returning again to FIG. 4, bids 134 from a plurality of advertiser systems 104 are received to disseminate digital marketing content based on the impression data (block 206). A bid manager module 416, for instance, may receive the bids 134. The bid manager module 416 is configured to then make a determination as to which of the plurality of advertiser systems is permitted to disseminate digital marketing content to the user based on the bids (block 208), i.e., which bid "won." This may be based on an amount of the bids 134, e.g., such that the highest bid wins. This may also be based on a variety of additional factors, such as to decrease repetition of digital marketing content such that the potential consumer 110 does not become oversaturated with repeated items of digital marketing content 136.

Real time distribution is then controlled by a digital marketing content distribution module 418 of the digital marketing content 136 associated with the determined advertiser system at the user's physical location (block 210). The digital marketing content distribution module 418, for instance, first obtains an item of digital marketing content 420 as indicated by the winning bid. The digital marketing content distribution module 418 then causes this item to be communicated over the network 112 to an output device of the physical retail environment 106. The physical retail environment 106, for instance, may include speakers, a display device (e.g., proximal to the determined location), and so forth to achieve this output.

The selected item of digital marketing content 420 may also be communicated to the mobile device 108 of the potential consumer 110, e.g., for output by the application 116. As shown in the example system 600 of FIG. 6, for instance, a location of the potential consumer 110 within a physical retail environment 106 is determined as previously described and is illustrated at a first stage 602. Impression data 120 that is collected that describes a context of this location is then generated, communicated to a real time bid platform, and used to generate a bid that serves as a basis to control output of digital marketing content 136 at a mobile device 108 of the potential consumer 110 as shown at the second stage 604. In this way, the potential consumer 110 is exposed to digital marketing content 136 in real time at a point in time at which the potential consumer 110 is most likely to be influenced by this exposure, which is not possible using convention techniques.

Example System and Device

Figure 7:
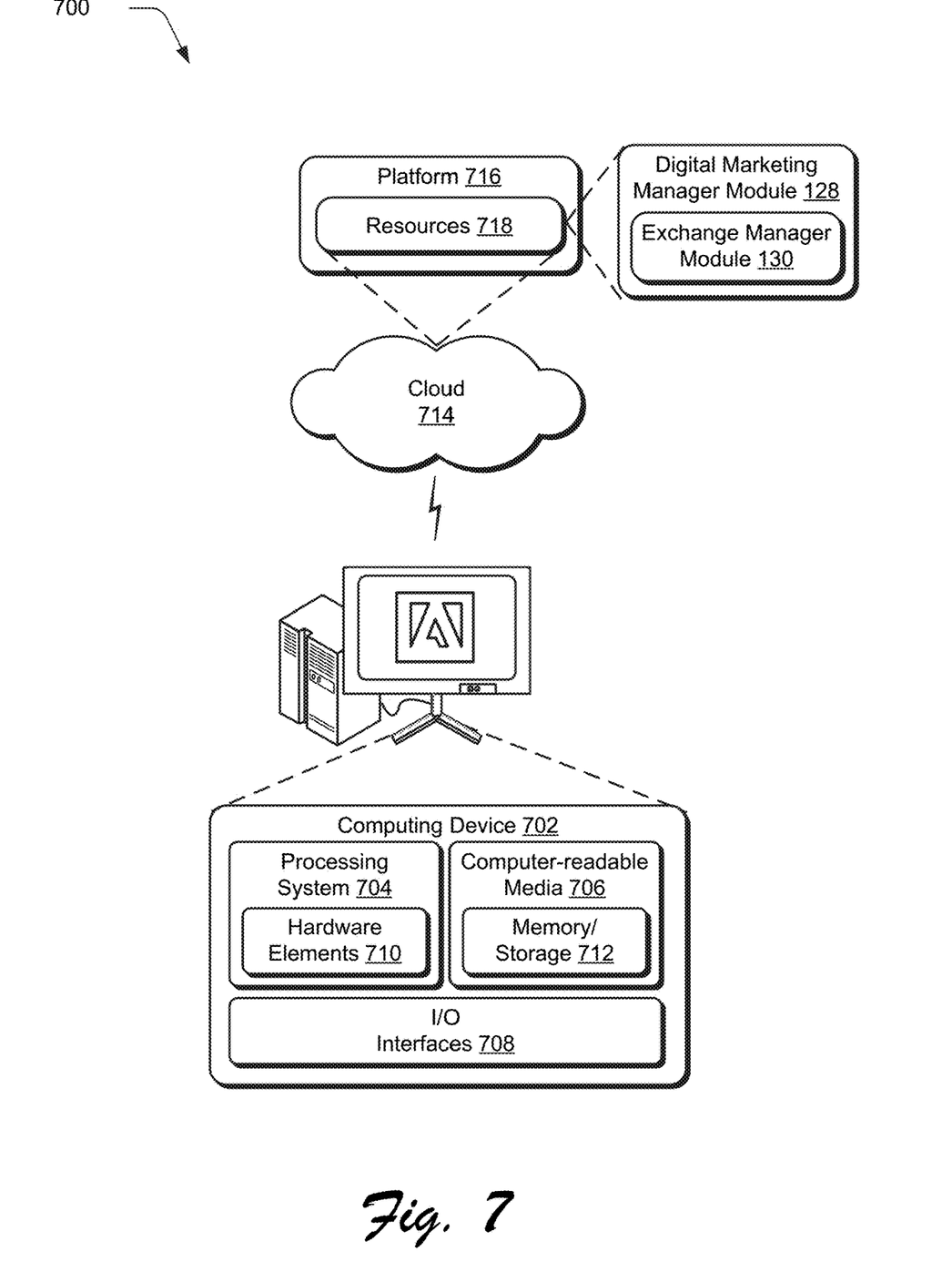
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the digital marketing manager module 128 and the exchange manager module 130. The computing device 702 may be, for example, a server of a service provider, a device associated with a client (e.g., a mobile device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a system comprising:
an exchange manager module implemented at least partially in hardware of a computing device to control output of digital marketing content in real time, the exchange manager module including:
an impression exposure module implemented to:
receive impression data that describes a user's physical location within a physical retail environment and products or services available at the user's physical location within the physical retail environment;
determine a similarity between the products or services available at the user's physical location within the physical retail environment with products or services available from individual ones of a plurality of advertiser systems for each respective advertiser system;

select a first advertiser system and a second advertiser system from the plurality of advertiser systems based on the determined similarities; and
expose a bid opportunity to the first advertiser system and the second advertiser system to bid for output of digital marketing content, the bid opportunity indicating the products or services available at the user's physical location;
a bid manager module implemented to:
receive a first bid generated by the first advertiser system and a second bid generated by the second advertiser system, the first and second bids generated for products or services identified as being available at the user's physical location within the physical retail environment; and
select a winning bid from the first bid or the second bid, the winning bid based at least in part on decreasing repetition of digital marketing content that has previously been exposed to the user to limit oversaturation; and
a digital marketing content distribution module to control real time distribution of digital marketing content associated with the winning bid at the user's physical location.

2. The system as described in claim 1, wherein the impression exposure module is further configured to identify brands of the products or services available at the user's physical location within the physical retail environment.

3. The system as described in claim 1, wherein the impression exposure module is further configured to identify the products or services available at the physical retail environment based on inventory data describing a number of the products or services available at the user's physical location within the physical retail environment.

4. The system as described in claim 1, wherein the impression exposure module is further configured to identify products or services previously purchased by the user.

5. The system as described in claim 4, wherein the impression exposure module is further configured to identify products or services previously purchased by the user at the physical retail environment.

6. The system as described in claim 1, wherein the bid opportunity is based at least in part on respective user profiles.

7. The system as described in claim 1, wherein the digital marketing content distribution module is configured to control real time distribution of the digital marketing content associated with the winning bid at the user's physical location using a mobile device.

8. The system of claim 1, wherein the digital marketing content distribution module is further configured to provide at least a portion of a value associated with the winning bid to the physical retail environment.

9. The system of claim 1, wherein the bid opportunity includes a user profile based on monitored user interaction with other physical retail environments.

10. In a digital medium environment, a method implemented by at least one computing device, the method comprising:
receiving, by the at least one computing device, impression data that describes a user's physical location within a physical retail environment, the impression data including inventory data describing an inventory of products or services available at the user's physical location within the physical retail environment;
generating, by the at least one computing device, a bid opportunity based on the impression data;
determining, by the at least one computing device, a similarity between the inventory data with products or services available from individual ones of a plurality of advertiser systems for each respective advertiser system;
selecting, by the at least one computing device, a first advertiser system and a second advertiser system from the plurality of advertiser systems based on the determined similarities;
communicating, by the at least one computing device, the bid opportunity to the selected first and second advertiser systems configured to disseminate digital marketing content, the bid opportunity indicating the products or services available at the user's physical location within the physical retail environment;
receiving, by the at least one computing device, a first bid from the first advertiser system and a second bid from the second advertiser system to disseminate the digital marketing content, the bids generated based on the communicated bid opportunity;
selecting, by the at least one computing device, a winning bid from the first bid or the second bid to disseminate the digital marketing content based on values of the bids and on decreasing repetition of digital marketing content that has previously been exposed to the user to limit oversaturation; and
controlling, by the at least one computing device, real time distribution of the digital marketing content associated with the winning bid at the user's physical location.

11. The method as described in claim 10, wherein the impression data identifies types of the products or services available at the user's physical location within the physical retail environment.

12. The method as described in claim 10, wherein the impression data identifies brands of the products or services available at the user's physical location within the physical retail environment.

13. The method as described in claim 10, wherein a respective said bid opportunity is withheld from being communicated to a third advertiser system due to lack of similarity between a product or service at the user's physical location within the physical retail environment as described by the inventory data and a product or a service provided by the third advertiser system.

14. The method as described in claim 10, wherein the impression data identifies products or services previously purchased by the user at the physical retail environment.

15. The method as described in claim 10, wherein the impression data identifies the user and the bid opportunity is based at least in part on a user profile of the user.

16. The method as described in claim 10, wherein the bid opportunity identifies the products or services available at the user's physical location within the physical retail environment that are provided by a competitor.

17. One or more computer-readable media storing instructions that, when executed by one or more processors, cause the one or more processors to perform operations comprising:
receiving impression data that describes a context of a user's physical location within a physical retail environment, the impression data including inventory data describing a number of products or services that are available at the physical retail environment;
configuring the impression data as a bid opportunity to be communicated to a plurality of advertiser systems, the bid opportunity indicating the products or services detected at the user's physical location as part of the inventory data;

determining a similarity between the inventory data with products or services available from individual ones of a plurality of advertiser systems for each respective advertiser system;

selecting advertiser systems from the plurality of advertiser systems based on the determined similarities;

communicating the bid opportunity to the selected advertiser systems to disseminate digital marketing content, the bid opportunity indicating the products or services available at the user's physical location within the physical retail environment;

receiving a plurality of bids from the plurality of advertiser systems to disseminate digital marketing content based on the bid opportunity;

selecting a winning bid from the plurality of bids based at least in part on decreasing repetition of digital marketing content that has previously been exposed to the user to limit oversaturation; and controlling real time distribution of the digital marketing content associated with the winning bid at the user's physical location.

18. The one or more computer-readable media as described in claim 17, wherein the impression data identifies types of the products or services available proximal to the user's physical location within the physical retail environment.

19. The one or more computer-readable media as described in claim 17, wherein the impression data identifies brands of the products or services available proximal to the user's physical location within the physical retail environment.

20. The one or more computer-readable media as described in claim 17, wherein the impression data identifies products or services previously purchased by the user at the physical retail environment.

* * * * *